US012596004B2

(12) United States Patent
    Konnakkodan et al.

(10) Patent No.: US 12,596,004 B2
(45) Date of Patent: Apr. 7, 2026

(54) SYSTEM FOR DETERMINING POSITION OF SERVICE PIN WITHIN PINHOLE OF WORK MACHINES

(71) Applicant: Caterpillar Inc., Peoria, IL (US)

(72) Inventors: Faheem Mohammed Konnakkodan, Kozhikode (IN); Riley Aaron Albers, Marana, AZ (US); Matthew Thomas Hansen, Big Rock, IL (US); David Michael Worth, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 372 days.

(21) Appl. No.: 18/332,783

(22) Filed: Jun. 12, 2023

(65) Prior Publication Data

US 2024/0410690 A1     Dec. 12, 2024

(51) Int. Cl.
    *G01B 21/22*     (2006.01)
    *E02F 3/34*     (2006.01)
    *E02F 3/36*     (2006.01)
    *E02F 9/26*     (2006.01)

(52) U.S. Cl.
    CPC ................ *G01B 21/22* (2013.01); *E02F 3/34* (2013.01); *E02F 3/3695* (2013.01); *E02F 9/26* (2013.01)

(58) Field of Classification Search
    CPC .. G01B 21/22; E02F 3/338; E02F 3/34; E02F 3/3695; E02F 9/26; G01D 5/02; G01D 5/04; G01M 13/00; F16B 19/00
    See application file for complete search history.

(56) References Cited

U.S. PATENT DOCUMENTS

| 5,300,918 | A | 4/1994 | Becker |
| 6,029,529 | A | 2/2000 | Recker et al. |
| 6,564,480 | B1 | 5/2003 | Tomita et al. |
| 6,959,497 | B2 | 11/2005 | Leidinger |

FOREIGN PATENT DOCUMENTS

| EP | 3159451 A1 | 4/2017 |

*Primary Examiner* — Benjamin R Schmitt

(57)     ABSTRACT

A system for determining a position of a pin inserted within a pinhole of a work machine is disclosed. The system includes a follower, a sensor, and a controller. The follower is biased to be in contact with the pin to follow the pin throughout a movement of the pin within the pinhole. The sensor is configured to detect a state of the follower corresponding to the position of the pin with respect to the pinhole. The controller is configured to determine the position of the pin based on the state of the follower.

20 Claims, 7 Drawing Sheets

SYSTEM FOR DETERMINING POSITION OF SERVICE PIN WITHIN PINHOLE OF WORK MACHINES

TECHNICAL FIELD

The present disclosure relates to a work machine having a frame and a lift arm movable relative to the frame. More particularly, the present disclosure relates to tracking a pin (e.g., a service pin) that engages the frame with the lift arm to restrict the movement of the lift arm relative to the frame.

BACKGROUND

A work machine, such as an earth moving machine, a construction machine, a mining machine, generally includes a frame, a lift arm, and a work implement, such as a bucket that facilitate the machine to perform a variety of tasks. The work implement may be coupled to the lift arm, and may be raised and lowered by moving the lift arm between a raised position and a lowered position relative to the frame of the work machine.

In order to perform a task on the work machine or on the lift arm (e.g., maintenance, servicing, inspection, etc.,), the lift arm may be required to be held or maintained at the raised position or at a position between the raised position and the lowered position. One way of holding or maintaining the lift arm in such a position is to provide a service pin, which may be moved between an operational position and a storage position. In the operational position, the service pin may engage the lift arm with the frame to restrict a movement of the lift arm with respect to the frame and, in the storage position, the service pin may be moved away from the operational position to disengage the lift arm from the frame.

European Patent No. 3,159,451 discloses a boom uplock device for a loader. The boom uplock device includes at least one elongated, cylindrical locking pin and a support for supporting the locking pin. The support is fastened to the front body, and the support has an essentially horizontal through going aperture, in which aperture the locking pin is movably fitted. There is formed a helical guiding groove into the surface of the locking pin, which helical guiding groove is in touch with a steering piece to control the movement of the locking pin, so that when the locking pin is rotating around its longitudinal axis the locking pin at the same time moves in its horizontal direction to enable contact between the locking pin and the underside of the boom to prevent the downward movement of the boom and keeping the boom in an elevated position, or to disable contact between the locking pin and the boom to allow the downward movement of the boom.

SUMMARY OF THE INVENTION

In one aspect, the disclosure relates to a system for determining a position of a pin inserted within a pinhole of a work machine. The system includes a follower, a sensor, and a controller. The follower is biased to be in contact with the pin to follow the pin throughout a movement of the pin within the pinhole. The sensor is configured to detect a state of the follower corresponding to the position of the pin with respect to the pinhole. The controller is configured to determine the position of the pin based on the state of the follower.

In another aspect, the disclosure is directed to a work machine. The work machine includes a frame and a lift arm coupled to the frame. The lift arm is configured to pivot relative to the frame. The lift arm defines a pinhole. Also, the work machine includes a pin inserted within the pinhole and configured to move within the pinhole to engage the lift arm with the frame to restrict movement of the lift arm relative to the frame. In addition, the system includes a system for determining a position of the pin inserted within the pinhole. The system includes a follower, a sensor, and a controller. The follower is biased to be in contact with the pin to follow the pin throughout the movement of the pin within the pinhole. The sensor is configured to detect a state of the follower corresponding to the position of the pin with respect to the pinhole. The controller is configured to determine the position of the pin based on the state of the follower.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
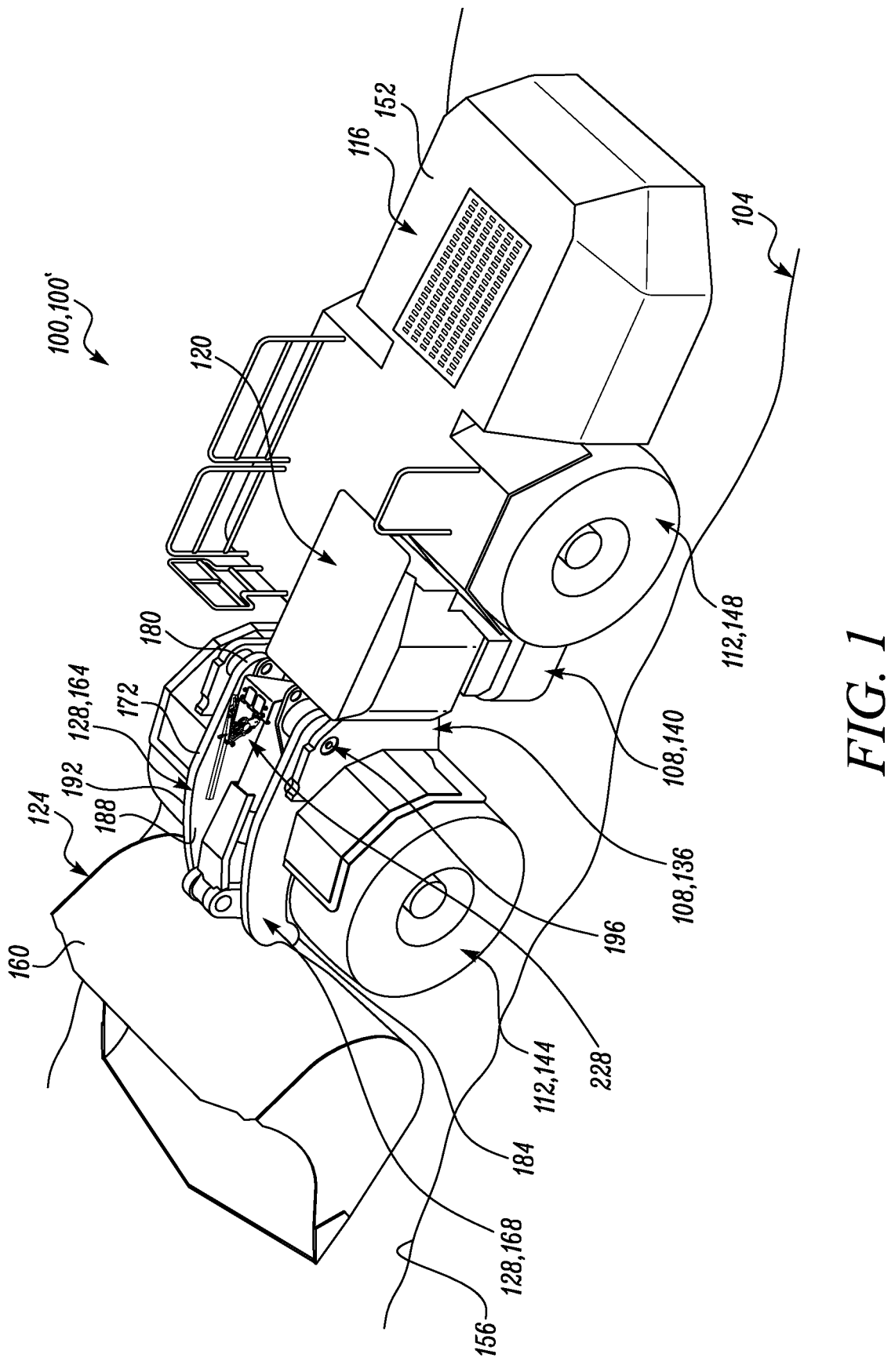
FIG. 1 illustrates an exemplary work machine including a frame and a lift arm pivotable relative to the frame, in accordance with an embodiment of the present disclosure.

Referring to FIG. 1, an exemplary work machine 100 (hereinafter referred to as "machine 100") is shown. The machine 100 may perform various operations associated with an industry such as mining, construction, farming, transportation, or any other industry known in the art. As an example, the machine 100 is embodied as an underground mining load-haul-dump (LHD) loader 100' configured to perform underground mining operations, such as digging, loading, conveying, and/or unloading materials (e.g., earthen material such as ore, coal, or other minerals) at an underground mining site 104. Alternatively, the machine 100 may be any material moving machine including, but not limited to, a backhoe loader, an excavator, a dozer, a track type tractor, a forklift, a skid steer loader, a multi-terrain loader, and the like.

Figure 2:
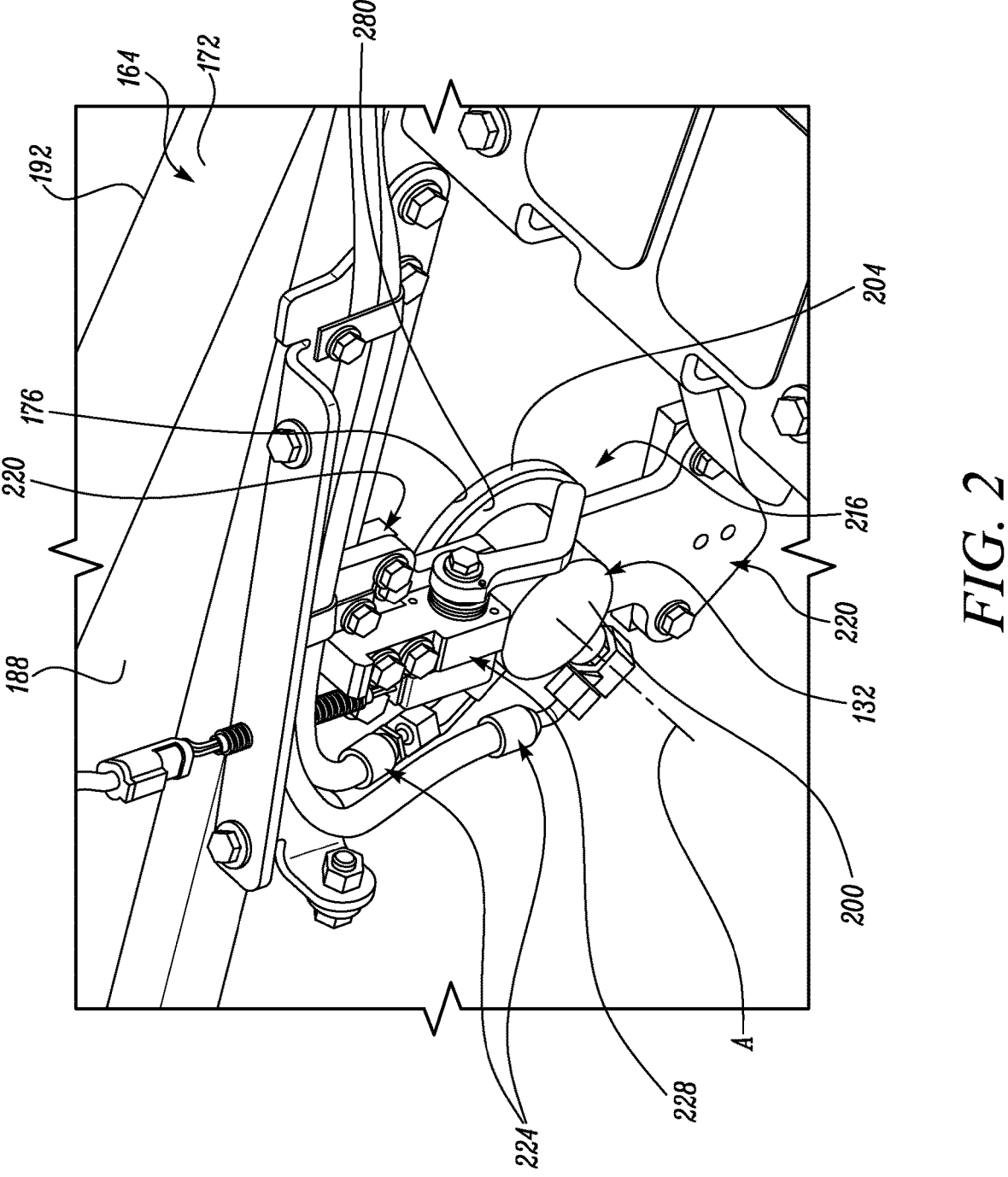
FIG. 2 illustrates a pin moveable between a first position and a second position with respect to a pinhole defined at the lift arm to engage and disengage the lift arm with the frame, and a system for determining positions of the pin within the pinhole, in accordance with an embodiment of the present disclosure.
Figure 3:
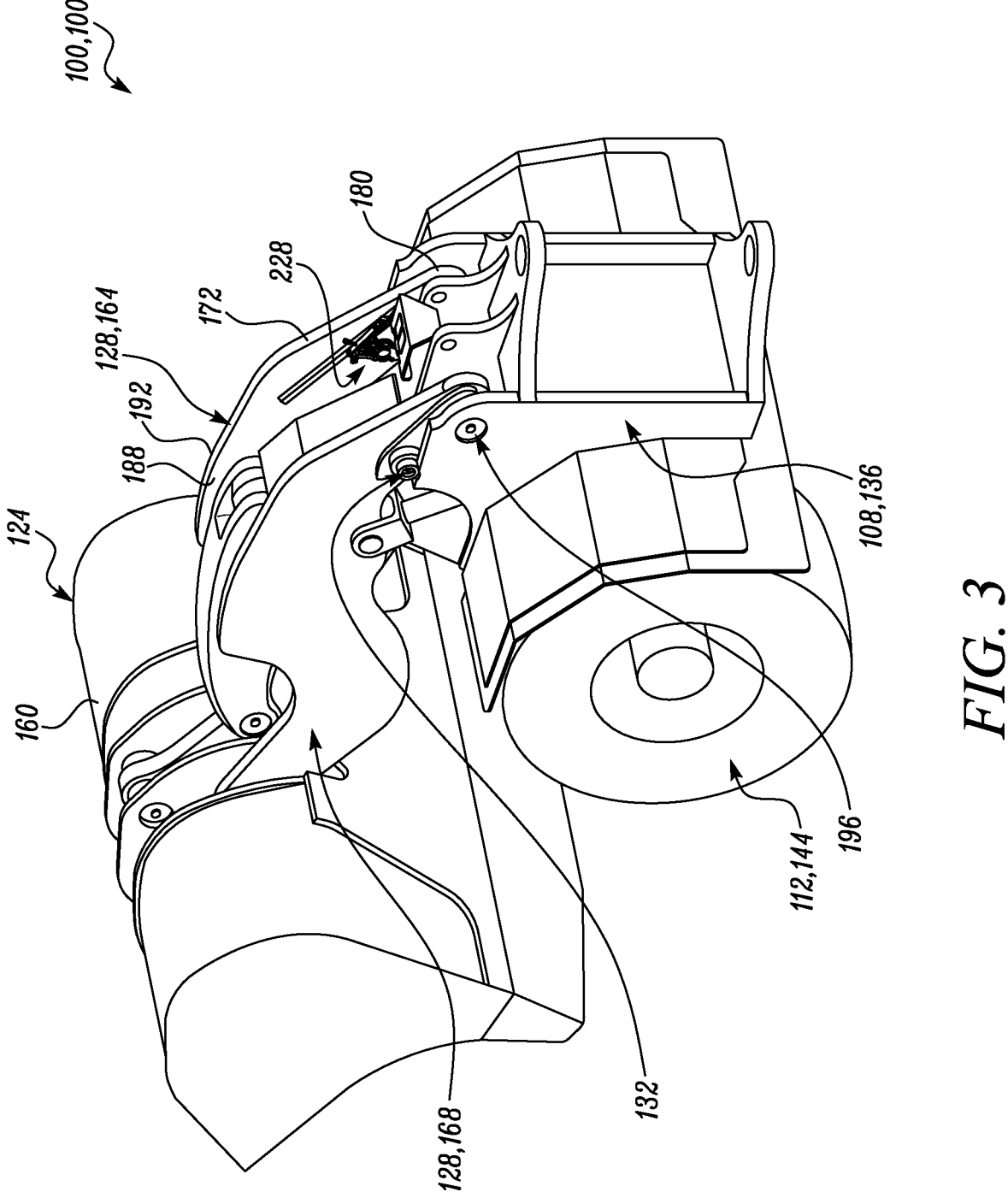
FIG. 3 illustrates the pin at the second position engaging the lift arm with the frame, in accordance with an embodiment of the present disclosure.

The machine 100 includes a frame 108, ground-engaging members 112, a power source 116, an operator cabin 120, a work implement 124, a lift arm 128, and a pin 132 (shown in FIGS. 2 and 3). The frame 108 may be a two-piece frame having a front frame portion 136 and a rear frame portion 140 coupled to the front frame portion 136. The front frame portion 136 may accommodate and/or support the lift arm 128, although other known components and structures may be supported by the front frame portion 136, as well. The rear frame portion 140 may accommodate and/or support the power source 116 and the operator cabin 120, although other known components and structures may be supported by the rear frame portion 140, as well.

The ground-engaging members 112 may support and propel the frame 108 (or the machine 100), for example, from one location to another location during a material moving operation. As shown in FIG. 1, the ground-engaging members 112 includes a set of front wheels 144 and a set of rear wheels 148. The set of front wheels 144 may support the front frame portion 136 and the set of rear wheels 148 may support the rear frame portion 140. In other embodiments, the ground-engaging members 112 may include crawler tracks (not shown) provided either alone or in combination with the wheels 144, 148.

The power source 116 may include a power compartment 152 and a prime mover (not shown) provided within the power compartment 152. The prime mover may embody a combustion engine, such as a diesel engine, a gasoline engine, a gaseous fuel powered engine (e.g., a natural gas engine), or any other type of combustion engine known in the art. The prime mover may alternatively embody a non-combustion source of power, such as a fuel cell, or a power storage device, such as a battery unit. The prime mover may be configured to generate an output power required to operate various systems on the machine 100, such as the ground-engaging members 112.

The operator cabin 120 may be supported over the frame 108 (e.g., on the rear frame portion 140). The operator cabin 120 may facilitate stationing of one or more operators therein, to monitor the operations of the machine 100. Also, the operator cabin 120 may house various components and controls of the machine 100, access to one or more of which may help the operators to control the machine's movement and/or operation. For example, the various components and controls of the machine 100 may include one or more steering wheels, touch screens, display devices, joysticks, switches etc., to facilitate an operator in operating the machine 100 and the work implement 124.

The work implement 124 may be utilized to perform various operations of the machine 100. For example, the work implement 124 may be utilized to alter or modify an underlying ground surface 156 (e.g., of the mining site 104) on which the machine 100 moves during operation. In another example, the work implement 124 may be utilized to scoop and receive materials deposited on the underlying ground surface 156 of the mining site 104. As shown in FIG. 1, the work implement 124 is coupled to the lift arm 128 in a manner that permits the work implement 124 to move (e.g., pivot or rotate) relative to the lift arm 128 to perform operations. In the present embodiment, as shown in FIG. 1, the work implement 124 includes a bucket 160. However, it may be contemplated that in other embodiments, other types of work implements, such as, but not limited to, blades, scrapers, grapples, or the like, may also be employed by the machine 100.

The lift arm 128 includes two spaced-apart lift arm members, namely—a first lift arm member 164 and a second lift arm member 168. For explanatory purposes, the first lift arm member 164 will now be explained in detail with reference to FIGS. 1 and 2. However, it should be noted that the description provided below for the first lift arm member 164 is equally applicable to the second lift arm member 168, without any limitations.

Figure 6:
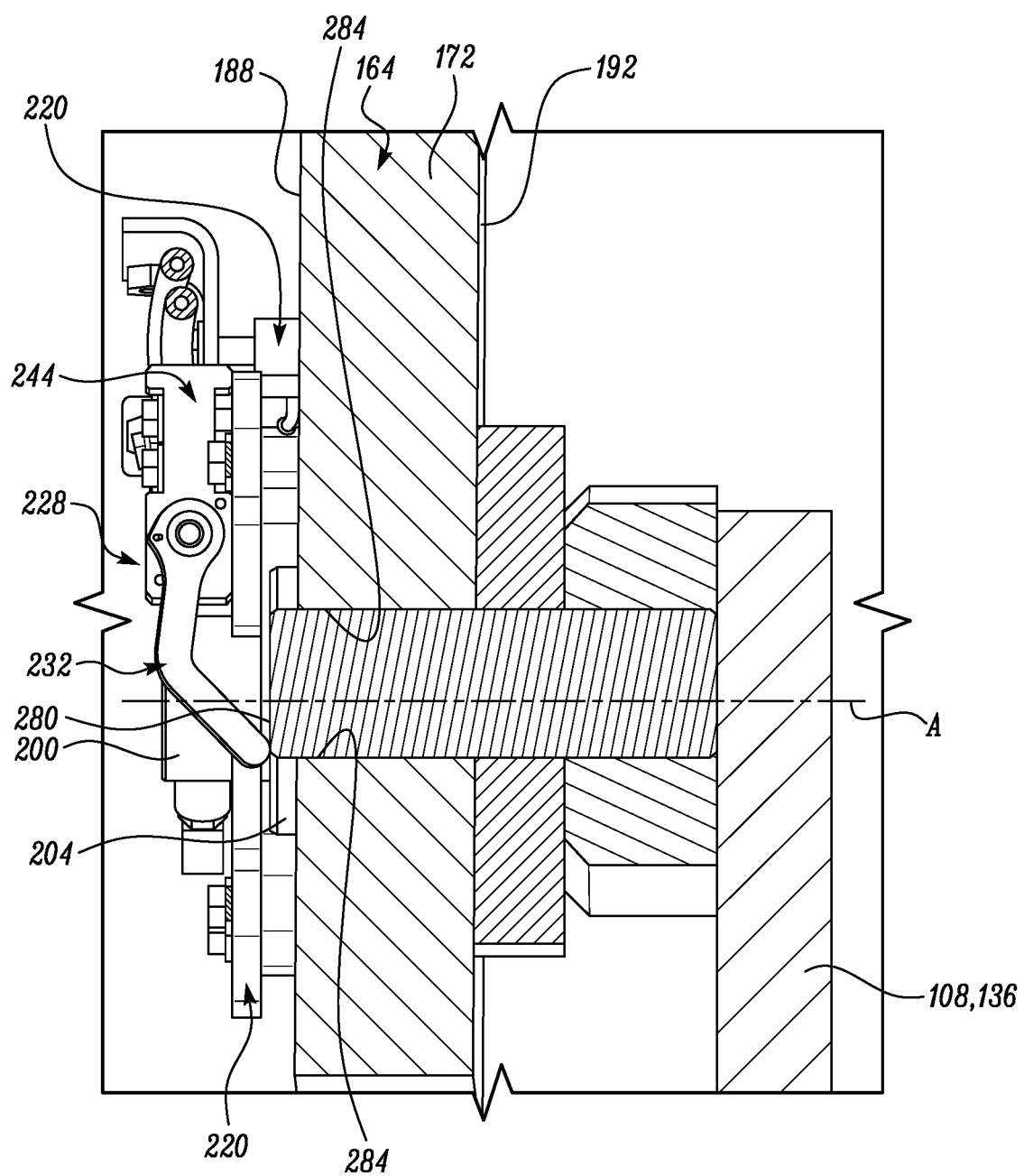
FIG. 6 illustrates a cross-sectional view depicting a state of a follower of the system corresponding to the first position of the pin, in accordance with an embodiment of the present disclosure.
Figure 7:
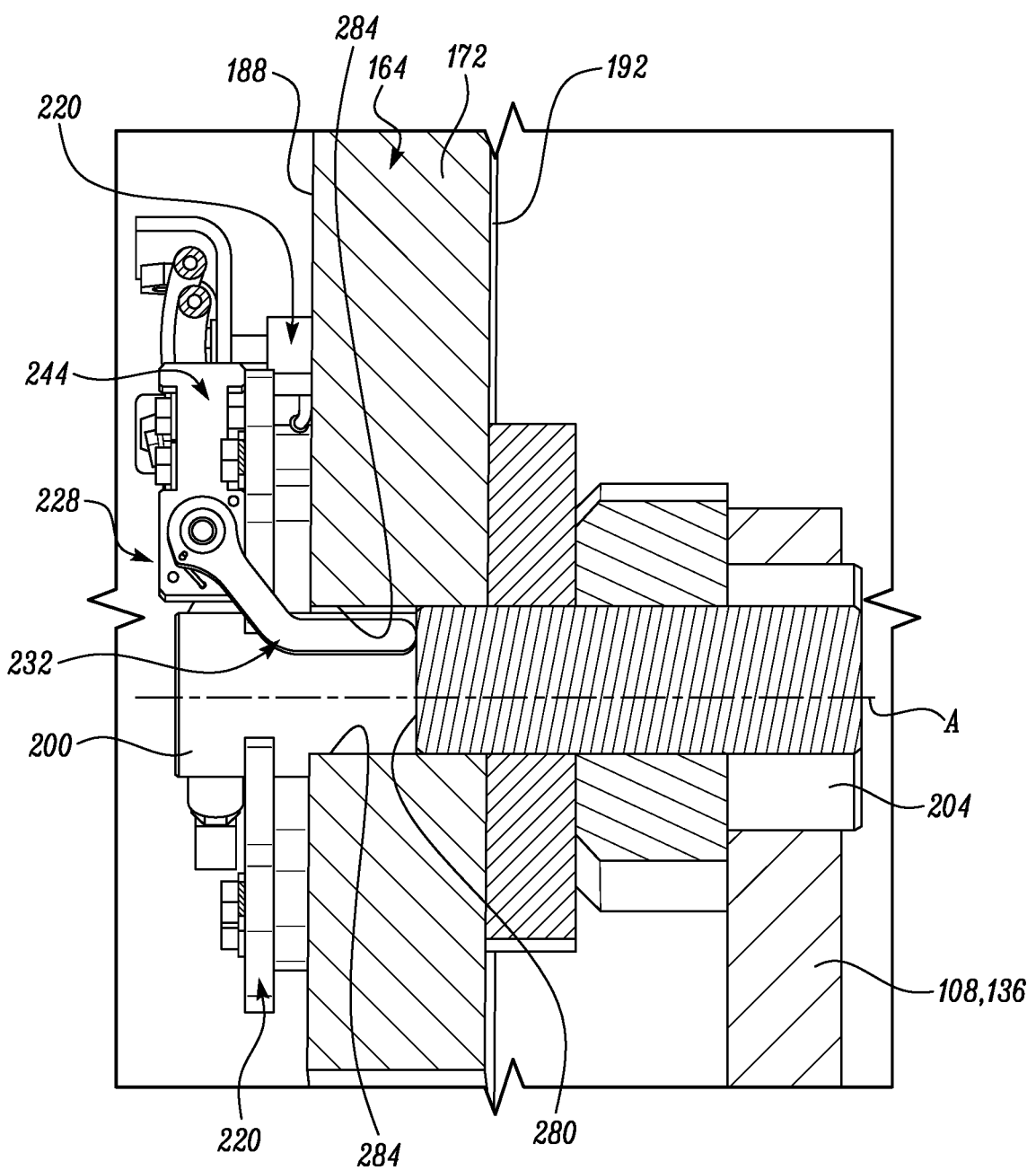
FIG. 7 illustrates a cross-sectional view depicting state of the follower of the system corresponding to the second position of the pin, in accordance with an embodiment of the present disclosure.

The first lift arm member 164 includes an elongated body 172 and a pinhole 176 (shown in FIGS. 2, 6, and 7). The elongated body 172 may define a first end portion 180, a second end portion 184, an interior surface 188, and an exterior surface 192. The first end portion 180 and the second end portion 184 are spaced apart from one another. Each of the interior surface 188 and the exterior surface 192 may extend between the first end portion 180 and the second end portion 184. The interior surface 188 may face towards the second lift arm member 168, and the exterior surface 192 may face away from the second lift arm member 168. The pinhole 176 may extend between the interior surface 188 and the exterior surface 192 (as shown in FIGS. 6 and 7). The pinhole 176 may be configured to receive the pin 132.

The lift arm 128 is coupled to the frame 108 in a manner that permits the lift arm 128 to move (e.g., pivot) relative to the frame 108. For instance, as shown in FIG. 1, the first end portion 180 of each of the first lift arm member 164 and the second lift arm member 168 is pivotally coupled to the front frame portion 136 of the machine 100 by using, for example, a linkage pin 196. Once coupled to the frame 108, the lift arm 128 may move (or pivot) between a raised position and a lowered position relative to the frame. In an example, the raised position may be a position at which the machine 100 may unload the material into another work machine, typically a receiving vehicle, for example, a dump truck, whereas the lowered position may be a position at which the machine 100 may scoop the material from the ground surface 156.

Further, the lift arm 128 is coupled to the work implement 124 in a manner that permits the work implement 124 to move (e.g., pivot) relative to the lift arm 128. For instance, as shown in FIG. 1, the second end portion 184 of each of the first lift arm member 164 and the second lift arm member 168 is pivotally coupled to the bucket 160 by any suitable coupling means such as a coupler, pin, latches, or any other mechanism generally known in the art.

Referring to FIG. 2, the pin 132 is discussed. The pin 132 may include an inner cylinder 200 and an outer cylinder 204. The inner cylinder 200 may define a longitudinal axis 'A'. The outer cylinder 204 may be annular in shape. The outer cylinder 204 may circumferentially surround the inner cylinder 200. The outer cylinder 204 may be operatively coupled to the inner cylinder 200 in a manner that permits the outer cylinder 204 to move with respect to the inner cylinder 200 along the longitudinal axis 'A'.

The pin 132 is configured to be inserted within the pinhole 176. Once inserted, the pin 132 (i.e., the outer cylinder 204) is allowed to move within the pinhole 176. For instance, the pin 132 is inserted within the pinhole 176 in a manner such that the inner cylinder 200 (of the pin 132) is fixed at a portion 216 of the lift arm 128 (e.g., the first lift arm member 164) surrounding the pinhole 176 by using, for example, one or more mounting plates 220, and the outer cylinder 204 of the pin 132 is moveable relative to the inner cylinder 200 within the pinhole 176.

The pin 132 (e.g., the outer cylinder 204) is allowed to move between a first position (as shown in FIG. 6) and a second position (as shown in FIGS. 3 and 7). When moved to the first position, the pin 132 (e.g., the outer cylinder 204) disengages the lift arm 128 from the frame 108 to facilitate free movement (e.g., pivotal movement) of the lift arm 128 relative to the frame 108. When moved to the second position, the pin 132 (e.g., the outer cylinder 204) engages the lift arm 128 with the frame 108 to restrict (or prevent) movement (e.g., pivotal movement) of the lift arm 128 relative to the frame 108.

In the present embodiment, the pin 132 is hydraulically actuated, for example, by one or more hydraulic lines 224 (as shown in FIG. 2) associated with any appropriate hydraulic circuit (not shown) of the machine 100, to move between the first position and the second position to correspondingly disengage and engage the lift arm 128 with the frame 108. In other embodiments, the pin 132 may be actuated by any suitable means, such as for example, pneumatically actuated, or electrically actuated, and/or the like.

Figure 4:
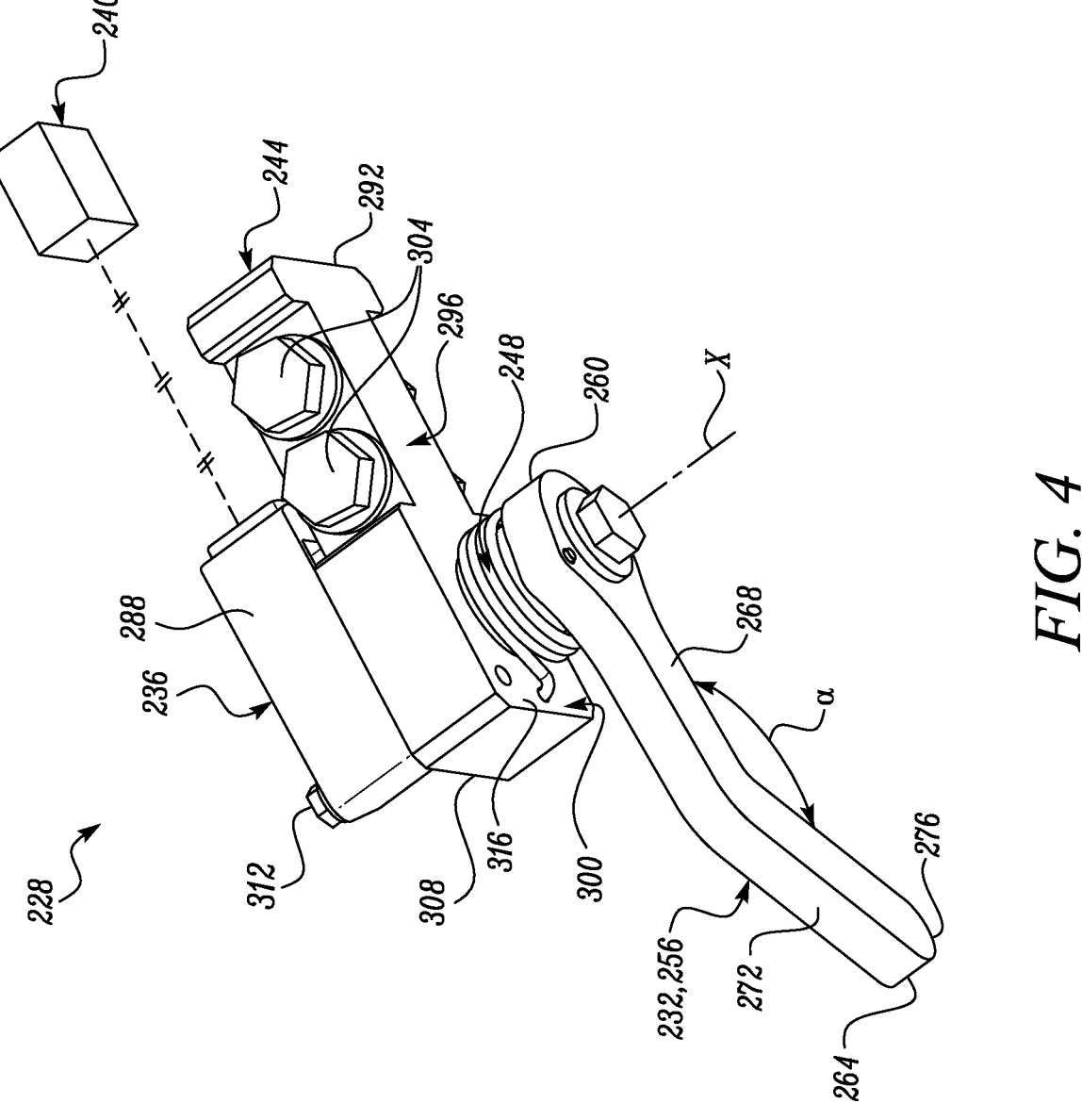
FIG. 4 illustrates a perspective view of the system, in accordance with an embodiment of the present disclosure.

To determine the position, i.e., the first position, or the second position, or any position between the first position and the second position, of the pin 132 inserted within the pinhole 176, in one or more aspects of the present disclosure, a system 228 is disclosed. The system 228 tracks the movement of the pin 132 within the pinhole 176 and outputs information associated with the position of the pin 132 with respect to the pinhole 176, for example, to an operator (or service personnel) of the machine 100. The system 228 includes a follower 232, a sensor 236, and a controller 240. Also, the system 228 may include a mounting member 244, a biasing member 248, and an actuator 252. Each of the follower 232, the sensor 236, the controller 240, the mounting member 244, the biasing member 248, and the actuator 252, will now be discussed in detail with reference to FIGS. 4 and 5.

The follower 232 may include an elongated structure 256. The elongated structure 256 may define a first follower end 260 and a second follower end 264 opposite to the first follower end 260. Also, the elongated structure 256 may define an eyelet 262 structured and arranged at the first follower end 260. Further, the elongated structure 256 may define a first arm portion 268 and a second arm portion 272. The first arm portion 268 may extend from the first follower end 260. The second arm portion 272 may extend from the first arm portion 268 to meet the second follower end 264. The second arm portion 272 may include an arcuate end surface 276. In the present embodiment, the arcuate end surface 276 is defined at the second follower end 264. As shown in FIGS. 2, 6, and 7, the arcuate end surface 276 is in contact with a face 280 of the pin 132 (e.g., of the outer cylinder 204) throughout the movement of the pin 132 (or the outer cylinder 204) within the pinhole 176.

The second arm portion 272 may be bent from and angled relative to the first arm portion 268. Such angled configuration between the second arm portion 272 and the first arm portion 268 may enable the follower 232 to follow the pin 132 throughout the movement of the pin 132 without colliding with walls (e.g., internal walls 284) of the pinhole 176. In the present embodiment, the second arm portion 272 forms an obtuse angle 'a' with the first arm portion 268. In an example, the obtuse angle 'a' ranges from about 91 degrees to about 130 degrees. In another example, the obtuse angle 'a' may range from about 100 degrees to about 150 degrees. It should be understood that the above-mentioned angle ranges are exemplary only and not intended to be limiting and hence, may vary depending upon the application requirements.

The follower 232 is configured to be biased (e.g., via the biasing member 248, discussed later) to follow the pin 132 throughout the movement of the pin 132 within the pinhole 176. In the present embodiment, the follower 232 is biased to pivot about an axis 'X' to follow the pin 132. Accordingly, the follower 232 may acquire states corresponding to the positions of the pin 132 with respect the pinhole 176. In the present embodiment, the state of the follower 232 is indicative of an angular position of the follower 232 about the axis 'X' corresponding to a position of the pin 132 with respect to the pinhole 176.

In an example, the follower 232 may acquire a first state (e.g., a first angular position about the first axis 'X') corresponding to the first position of the pin 132 with respect to the pinhole 176 (as shown in FIG. 6). In another example, the follower 232 may acquire a second state (e.g., a second angular position about the first axis 'X') corresponding to the second position of the pin 132 with respect to the pinhole 176 (as shown in FIG. 7). It should be understood that the follower 232 may acquire any suitable state (e.g., any suitable angular position about the first axis 'X') between the first state and the second state, corresponding to any position between the first position and the second position of the pin 132 with respect to the pinhole 176.

The sensor 236 is operatively coupled (e.g., via the actuator 252, discussed later) with the follower 232. The sensor 236 is configured to detect the state of the follower 232 corresponding to the position of the pin 132 with respect to the pinhole 176. In the present embodiment, the sensor 236 is configured to detect the angular position (about the axis 'X') of the follower 232 corresponding to the position of the pin 132 with respect to the pinhole 176. To this end, the sensor 236 may include a rotary position sensor 288 having one or more integrated circuits that may detect the state (i.e., angular position) or movement (e.g., a rotary movement or rotational variation) of the follower 232 about the axis 'X', and translate or convert the state (i.e., angular position) or movement (e.g., a rotary movement or rotational variation) of the follower 232 about the axis 'X' to an electrical signal. In an example, upon detecting the first state (or the first angular position) of the follower 232 (corresponding to the first position of the pin 132), the controller 240 may generate a first electrical signal. In another example, upon detecting the second state (or the second angular position) of the follower 232 (corresponding to the second position of the pin 132), the controller 240 may generate a second electrical signal.

The controller 240 is communicably coupled to the sensor 236. The controller 240 is configured to receive the electrical signal, corresponding to the state (e.g., the angular position) from the sensor 236. Upon receipt of the electrical signal corresponding to the state of the follower 232, the controller 240 may process the electrical signal to determine the position of the pin 132 with respect to the pinhole 176. In the present embodiment, the controller 240 uses one or more datasets, stored in a memory (not shown) associated with the controller 240, to determine the position of the pin 132 with respect to the pinhole 176.

The datasets may include a look-up table that defines a correlation between different states (e.g., angular positions) of the follower 232 and corresponding positions of the pin 132 with respect to the pinhole 176. In an example, the look-up table may include values (e.g., in millimeters) corresponding to distinct positions of the pin 132 with respect to the pinhole 176 as a function of the different states (e.g., the angular positions) of the follower 232.

In some embodiments, the look-up table may be populated with values (corresponding to position of the pin 132) based on calibration of the machine 100. For that, the pin 132 (e.g., the outer cylinder 204) may be put to one extreme position (e.g., the first position) such that the sensor 236 may sense the corresponding state (e.g., the first state) of the follower 232 and accordingly, transmit the corresponding signal (e.g., first signal) to the controller 240. The controller 240 may receive and store the signal as the first signal corresponding to the extreme position (e.g., the first position) of the pin 132. Next, the pin 132 (e.g., the outer cylinder 204) may be put to the other extreme position (e.g., the second position) such that the sensor 236 may sense the corresponding state (e.g., the second state) of the follower 232 and accordingly, transmit the corresponding signal (e.g., the second signal) to the controller 240. The controller 240 may receive and store the signal as the second signal corresponding to the extreme position (e.g., the second position) of the pin 132. The controller 240 may derive and store different position values (of the pin 132 relative to the pinhole 176) corresponding to different states (of the follower 232) based on these two states (i.e., the first state and the second state).

It should be noted that the number of values (associated with the position of the pin 132) corresponding to the number of states (of the follower 232) stored in the look-up table is dependent upon the desired precision of the system. In some embodiments, the controller 240 may apply numerical interpolation techniques (e.g., a linear interpolation technique) to determine a value (of a position of the pin 132) corresponding to a state (of the follower 232) that falls between any two discrete states used to form the look-up table.

The controller 240 may be communicably coupled to the machine's electronic control module (ECM) (not shown), and or a display module (not shown) to provide output associated with the position of the pin 132 with respect to the pinhole 176, for example, to the operator of the machine 100. Optionally, the controller 240 may be integral and be one and the same as one of the ECMs of the machine 100. Further, the controller 240 may be a microprocessor-based device, and/or may be envisioned as an application-specific integrated circuit, or other logic devices, which provide controller functionality, and such devices being known to those with ordinary skill in the art.

In one example, it is possible for the controller 240 to include or be representative of one or more controllers having separate or integrally configured processing units to process a variety of data (or input or commands). In some embodiments, a transmission of data between the controller 240 and various other controllers and/or the sensor 236, the controls, etc., may be facilitated wirelessly or through a standardized CAN bus protocol. Further, the controller 240 may be optimally suited for accommodation within certain machine panels or portions from where the controller 240 may remain accessible for ease of use, service, calibration, and repairs.

Processing units of the controller 240, to convert and/or process various input, command, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory may include a hard disk drive (HDD), and a secure digital (SD) card. Further, the memory may include non-volatile/volatile memory units such as a random-access memory (RAM)/a read only memory (ROM), which may include associated input and output buses. The memory may be configured to store various other instruction sets, datasets, for various other functions of the machine 100, along with the datasets, discussed above.

The mounting member 244 is now discussed. The mounting member 244 may include a mounting block 292. The mounting block 292 may define a first portion 296 and a second portion 300. The first portion 296 may be configured to be coupled to the mounting plate 220 (fixed at the portion 216 of the lift arm 128 surrounding the pinhole 176), for example, by using fasteners 304, to mount the mounting member 244 to the portion 216 of the lift arm 128. Alternatively, the first portion 296 may be directly mounted onto the portion 216 of the lift arm 128.

Figure 5:
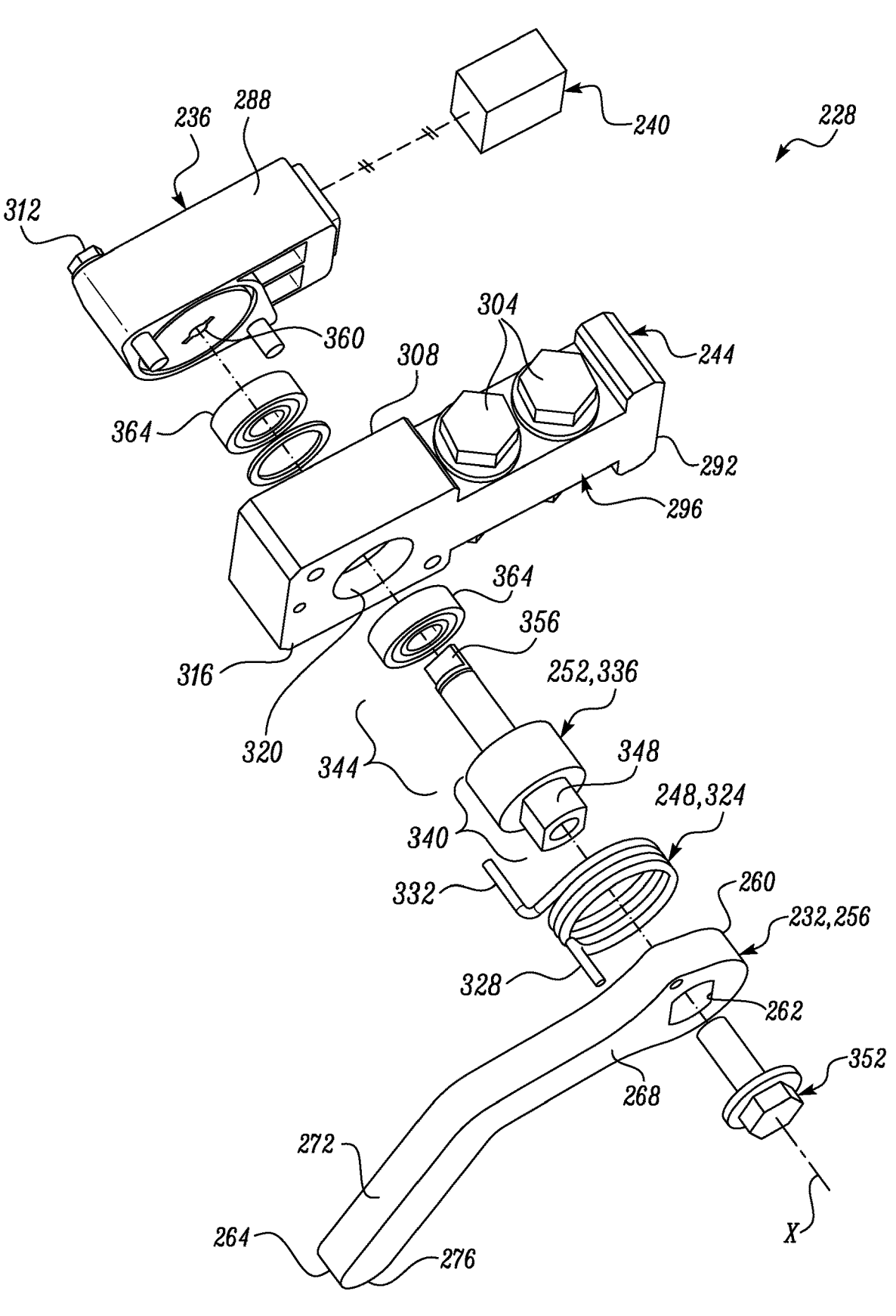
FIG. 5 illustrates an exploded view of the system, in accordance with an embodiment of the present disclosure.

The second portion 300 may facilitate coupling of the mounting member 244 with the follower 232 and the sensor 236. For instance, the second portion 300 may define a first surface 308 configured to couple the sensor 236 to the mounting member 244, for example, via a fastener 312, and may further define a second surface 316 opposite to the first surface 308 and configured to couple the follower 232 to the mounting member 244, for example, via the biasing member 248. Further, the mounting member 244 may define a mounting through-hole 320 structured and arranged at the second portion 300. For example, as shown in FIG. 5, the mounting through-hole 320 extends between the first surface 308 and the second surface 316 of the second portion 300.

The biasing member 248 is now discussed with reference to FIG. 5. The biasing member 248 may be coupled to the follower 232 and the mounting member 244. In so doing, the biasing member 248 may be able to apply tension or a biasing force between the follower 232 and the mounting member 244 and hence, bias the follower 232 to be in contact with the pin 132 throughout the movement of the pin 132 within the pinhole 176. In the present embodiment, the biasing member 248 may include a torsion spring 324, although it is possible for the biasing member 248 to include other biasing members, such as a pull string, linear spring, and/or the like. The torsion spring 324 may define a first tang 328 and a second tang 332. The first tang 328 may be coupled (e.g., fixedly coupled) to the follower 232 and the second tang 332 may be coupled (e.g., fixedly coupled) to the mounting member 244 (e.g., to the second portion 300 of the mounting member 244) so as to apply the tension or the biasing force between the follower 232 and the mounting member 244.

The actuator 252 is now discussed. The actuator 252 may operatively couple the follower 232 to the sensor 236. In the present embodiment, the actuator 252 includes a spindle 336. The spindle 336 may define a head portion 340 and a shank portion 344. The head portion 340 may define a first engagement portion 348 configured to be coupled to the follower 232. In an exemplary assembly of the spindle 336 with the follower 232, the first engagement portion 348 is inserted within the eyelet 262 of the follower 232 and is fixedly coupled to the follower 232, for example, via a fastener 352. To ensure no rotation between the actuator 252 and the follower 232 once assembled together, the first engagement portion 348 of the actuator 252 has a shape similar to a shape of the eyelet 262 of the follower 232. For example, the first engagement portion 348 and the eyelet 262 have oblong shapes. The shank portion 344 may define a second engagement portion 356 configured to be engaged with a corresponding mating portion 360 of the sensor 236.

Further, the actuator 252 may be operatively coupled to the biasing member 248, for example, through the follower 232. For instance, the biasing member 248 (i.e., the torsion spring 324) may circumferentially surround the head portion 340 of the actuator 252 (i.e., the spindle 336). Additionally, the actuator 252 (or the spindle 336) may be operatively coupled to the mounting member 244. In an exemplary assembly of the actuator 252 with the mounting member 244, the actuator 252 is passed through a pair of co-axial bearings 364 (disposed within the mounting through-hole 320 of the mounting member 244) in a manner such that the shank portion 344 of the actuator 252 is rotatably supported on the co-axial bearings 364.

Once the actuator 252 is coupled to the follower 232, the sensor 236, the biasing member 248, and the mounting member 244, the actuator 252 may be driven (e.g., rotatably driven about the axis 'X') by the biased movement (e.g., biased pivoting movement) of the follower 232 following the pin 132. In so doing, the actuator 252 may correspondingly actuate the sensor 236. Upon actuation, the sensor 236 may detect the state (e.g., the angular position) of the follower 232 about the axis 'X', and accordingly, generate the electrical signal.

INDUSTRIAL APPLICABILITY

Servicing of the machine 100 is generally performed after a predefined duration of operation of the machine 100. During servicing, various components of the machine 100 may be inspected and a maintenance activity is performed if one or more components (e.g., components located in vicinity of the lift arm 128) are found faulty. In certain situations, the lift arm 128 of the machine 100 may need to be raised and maintained at a desired height (e.g., at a position between the raised and lowered position) relative to the ground surface 156 to perform an inspection and/or maintenance of the components. To maintain the lift arm 128 at the desired height, the pin 132 (e.g., service pin 132) is inserted within pinhole 176 and is actuated to move with respect to the pinhole 176 to engage (as shown in FIG. 3) or disengage the lift arm 128 with the frame 108. Because the pin 132 is actuated via at least one of hydraulic sources, pneumatic sources, electrical sources, and/or the like, but not manually, the operator (or the service personnel) of the machine 100 may need to know the position of the pin 132 with respect to the pinhole 176 prior to performing any inspection and/or maintenance of the components in the vicinity of the lift arm 128. In this regard, the present disclosure provides the system 228 to determine the position of the pin 132 with respect to the pinhole 176. The system 228 may also communicate information about the position of the pin 132, for example, to the operator (or the service personnel) of the machine 100.

The system 228 may be retrofitted on any machine equipped with a lift arm (such as the lift arm 128), a frame (such as the frame 108), and a service pin (such as the pin 132), with little or no modification to existing systems. The system 228 provides fast and accurate position of the pin 132 with respect to the pinhole 176 to the operator (or the service personnel). This facilitates the operator (or the service personnel) of the machine 100 to know whether the pin 132 is fully engaged, or partially engaged, or fully disengaged, with the frame 108 of the machine 100 and accordingly, take desired actions. In so doing, the system 228 provides safe operation environment for the operator (or the service personnel) and/or for the machine 100. Further, the system 228 reduces the need to mount a higher number of position sensors for determining the position of the pin 132, thereby reducing the overall operating cost of the machine 100.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system and/or the work machine of the present disclosure without departing from the scope of the disclosure. Other embodiments will be apparent to those skilled in the art from consideration of the specification and practice of the system and/or the work machine disclosed herein. It is intended that the specification and examples be considered as exemplary only, with a true scope of the disclosure being indicated by the following claims and their equivalent.

What is claimed is:

1. A system for determining a longitudinal position of a pin having a longitudinal axis inserted within a pinhole of a work machine, the system comprising:

a follower biased to be in contact with the pin to follow the pin throughout a longitudinal movement of the pin within the pinhole from a first longitudinal position within the pinhole wherein the pin permits movement of a lift arm of the work machine relative to a frame of the work machine to a second longitudinal position within the pinhole wherein the pin restricts movement of the lift arm relative to the frame;

a sensor configured to detect a state of the follower corresponding to the second longitudinal position of the pin with respect to the pinhole; and a controller configured to determine whether the pin is in the second longitudinal position based on the state of the follower.

2. The system of claim 1, wherein the follower is configured to pivot about an axis to follow the pin throughout the movement of the pin within the pinhole, and wherein the state of the follower is indicative of an angular position of the follower about the axis.

3. The system of claim 2, wherein the follower includes an elongated structure defining a first arm portion and a second arm portion angled relative to the first arm portion such that the follower follows the pin throughout the movement of the pin without colliding with walls of the pinhole.

4. The system of claim 3, wherein the second arm portion includes an arcuate end surface configured to be in contact with a face of the pin throughout the movement of the pin within the pinhole.

5. The system of claim 2 further including an actuator operatively coupling the follower to the sensor and configured to be driven about the axis by the pivoting of the follower to actuate the sensor to detect the angular position of the follower about the axis.

6. The system of claim 5, wherein the actuator includes a spindle defining a head portion and a shank portion extending from the head portion, the head portion defining a first engagement portion configured to be coupled to the follower, and the shank portion defining a second engagement portion configured to be engaged with a corresponding mating portion of the sensor.

7. The system of claim 1 further including a mounting member coupled to the follower and the sensor, the mounting member is configured to be mounted to a portion of the work machine surrounding the pinhole.

8. The system of claim 7 further including a biasing member coupled to the follower and the mounting member to bias the follower to be in contact with the pin throughout the movement of the pin within the pinhole.

9. The system of claim 8, wherein the biasing member includes a torsion spring defining a first tang coupled to the follower and a second tang coupled to the mounting member.

10. The system of claim 1, wherein the controller is configured to determine a position of the pin by using one or more datasets correlating different states of the follower with corresponding positions of the pin with respect to the pinhole.

11. A work machine, comprising:

a frame;

a lift arm coupled to the frame and configured to pivot relative to the frame, the lift arm defining a pinhole;

a pin having a longitudinal axis inserted within the pinhole and, wherein the pin is movable within the pinhole between a first longitudinal position wherein the pin permits pivoting of the lift arm relative to the frame and a second longitudinal position wherein the pin restricts pivoting of the lift arm relative to the frame;

a system for determining a longitudinal position of the pin inserted within the pinhole, the system including:

a follower biased to be in contact with the pin to follow the pin throughout the movement of the pin within the pinhole from the first longitudinal position to the second longitudinal position;

a sensor configured to detect a state of the follower corresponding to the second longitudinal position of the pin with respect to the pinhole; and a controller configured to determine whether the pin is in the second longitudinal position based on the state of the follower.

12. The work machine of claim 11, wherein the follower is configured to pivot about an axis to follow the pin throughout the movement of the pin within the pinhole, and wherein the state of the follower is indicative of an angular position of the follower about the axis.

13. The work machine of claim 12, wherein the follower includes an elongated structure defining a first arm portion and a second arm portion angled relative to the first arm portion such that the follower follows the pin throughout the movement of the pin without colliding with walls of the pinhole.

14. The work machine of claim 13, wherein the second arm portion includes an arcuate end surface configured to be in contact with a face of the pin throughout the movement of the pin within the pinhole.

15. The work machine of claim 12, wherein the system includes an actuator operatively coupling the follower to the sensor and configured to be driven about the axis by the pivoting of the follower to actuate the sensor to detect the angular position of the follower about the axis.

16. The work machine of claim 15, wherein the actuator includes a spindle defining a head portion and a shank portion extending from the head portion, the head portion defining a first engagement portion configured to be coupled to the follower, and the shank portion defining a second engagement portion configured to be engaged with a corresponding mating portion of the sensor.

17. The work machine of claim 11, wherein the system includes a mounting member coupled to the follower and the sensor, the mounting member is configured to be mounted to a portion of the lift arm surrounding the pinhole.

18. The work machine of claim 17, wherein the system includes a biasing member coupled to the follower and the mounting member to bias the follower to be in contact with the pin throughout the movement of the pin within the pinhole.

19. The work machine of claim 18, wherein the biasing member includes a torsion spring defining a first tang coupled to the follower and a second tang coupled to the mounting member.

20. The work machine of claim 11, wherein the controller is configured to determine a position of the pin by using one or more datasets correlating different states of the follower with corresponding positions of the pin with respect to the pinhole.

* * * * *